United States Patent [19]

Koyama et al.

[11] Patent Number: 5,246,753

[45] Date of Patent: * Sep. 21, 1993

[54] PLASTIC MULTILAYER VESSEL

[75] Inventors: Masayasu Koyama, Zushi; Yasuhiro Oda, Yokohama; Muneki Yamada, Fujisawa, all of Japan

[73] Assignee: Toyo Seikan Kaisha Ltd., Tokyo, Japan

[*] Notice: The portion of the term of this patent subsequent to Oct. 6, 2009 has been disclaimed.

[21] Appl. No.: 550,581

[22] Filed: Jul. 10, 1990

[30] Foreign Application Priority Data

Jul. 10, 1989 [JP] Japan .................. 1-175602

[51] Int. Cl.$^5$ .................. B32B 27/04; B32B 27/08
[52] U.S. Cl. .................. 428/36.7; 428/36.6; 428/403; 428/404; 428/406; 428/475.8; 428/477.7; 428/483; 428/515; 428/518; 428/520; 428/522; 428/516; 428/689; 428/913; 252/188.28
[58] Field of Search .................. 428/36.6, 36.7, 35.8, 428/35.9, 520, 522, 913, 403, 404, 406, 475.8, 689, 477.7, 483; 523/200, 215, 216, 217, 515; 524/204, 260, 202, 90; 252/188.28

[56] References Cited

U.S. PATENT DOCUMENTS

| | | | |
|---|---|---|---|
| 4,048,361 | 9/1977 | Valyi | 428/36.7 |
| 4,407,897 | 10/1983 | Farrell | 428/36.7 |
| 4,425,410 | 1/1984 | Farrell | 428/36.7 |
| 4,702,966 | 10/1987 | Farrell | 428/500 |
| 4,820,442 | 4/1989 | Motoyama | 252/188.28 |
| 4,886,618 | 12/1989 | Novak | 252/188.28 |

FOREIGN PATENT DOCUMENTS 0367835  5/1990  European Pat. Off. .
56-159166  12/1981  Japan .

Primary Examiner—George F. Lesmes
Assistant Examiner—Rena L. Dye
Attorney, Agent, or Firm—Sughrue, Mion, Zinn, Macpeak & Seas

[57] ABSTRACT

Disclosed is a plastic multilayer vessel having a laminate structure comprising an intermediate layer of a resin composition formed by incorporating an organic metal complex of a transition metal into a gas-barrier resin having a specific oxygen permeation coefficient and a specific water absorption, and outer and inner layers of a moisture-resistant thermoplastic resin disposed on both the sides of the intermediate layer. This vessel shows an excellent resistance to the permeation of oxygen even under conditions where water and heat simultaneously act.

27 Claims, 1 Drawing Sheet

PLASTIC MULTILAYER VESSEL

BACKGROUND OF THE INVENTION (1) Field of the Invention

The present invention relates to a plastic multilayer vessel having an excellent oxygen permeation resistance under conditions where water and heat act. More particularly, the present invention relates to a plastic multilayer vessel having an excellent oxygen permeation resistance at the heat sterilization and with the lapse of time after the heat sterilization.

(2) Description of the Related Art

Metal cans, glass bottles and various plastic vessels have been used as packaging vessels. Plastic vessels are used in various fields because the weight is light, the impact resistance is high and the manufacturing cost is small.

In case of metal cans or glass bottles, permeation of oxygen through the vessel is zero. In contrast, in case of plastic vessels, permeation of oxygen through the vessel wall cannot be neglected, and a problem arises with respect to the storage of a content of the vessel.

As means for overcoming this disadvantage, there has been proposed and used a plastic vessel having a multi-layer structure comprising at least one layer composed of a resin having an oxygen permeation resistance, such as an ethylene/vinyl alcohol copolymer.

From old, an oxygen scavenger has been used for removing oxygen from the interior of a vessel, and Japanese Examined Patent Publication No. 62-1824 proposes application of this oxygen scavenger to the vessel wall. Namely, according to this conventional technique, a layer of an oxygen-permeable resin in which an oxygen scavenger composed mainly of a reducing substance is incorporated is laminated with a layer having an oxygen-barrier property, wherey a packaging laminate structure is formed.

According to this conventional technique, the oxygen scavenger present in the vessel wall absorbs oxygen in the vessel to maintain a highly oxygen-free state in the vessel. However, the packaging vessel of this type is still insufficient in that the oxygen concentration cannot be controlled to a low level under conditions in which water and heat simultaneously act, namely under heat sterilization conditions.

An oxygen-barrier resin such as an ethylene/vinyl alcohol copolymer has, in general, a moisture-absorbing property, and the resin also has such a property that the oxygen permeation coefficient increases when it absorbs moisture. Accordingly, a multilayer structure comprising an intermediate layer of an oxygen barrier resin and inner and outer layers of a moisture-resistant resin such as an olefin resin disposed on both the sides of the intermediate layer is generally adopted. However, under the above-mentioned conditions in which water and heat simultaneously act, permeation of water through the olefin resin layer is caused, and it is considered that the amount of oxygen in the vessel increases by increase of the oxygen gas permeability by the absorption of moisture and also by increase of the oxygen permeation by the elevation of the temperature.

As the means for overcoming the above-mentioned defect, we proposed a plastic multilayer vessel composed of a laminate comprising an intermediate layer formed of a resin composition comprising a gas-barrier thermoplastic resin having a low oxygen permeability and a high water absorption and an oxygen scavenger incorporated therein and layers of a moisture-resistant thermoplastic resin disposed on both the sides of the intermediate layer (see Japanese Patent Application No. 63-105446).

This plastic multilayer vessel is epoch-making in that the permeation of oxygen during the retort sterilization and the permeation of oxygen with the lapse of time after the retort sterilization can be controlled, but this plastic multilayer vessel is still insufficient in that the oxygen-absorbing property is relatively low when the partial pressure of oxygen is low, and the oxygen-absorbing speed is relatively low.

SUMMARY OF THE INVENTION

We found that if an organic metal complex of a transition metal is selected among various oxygen-absorbing compounds and this complex is incorporated in a gas-barrier thermoplastic resin, the absorption of oxygen can be performed at a high speed and effectively even in the state where the partial pressure of oxygen is relatively low.

In accordance with one aspect of the present invention, there is provided a plastic multilayer vessel having a laminate structure comprising an intermediate layer composed of a resin composition formed by incorporating an organic metal complex of a transition metal into a gas-barrier thermoplastic resin having an oxygen permeation coefficient smaller than $10^{-12}$ cc·cm/cm$^2$·sec·cmHg at a temperature of 20° C. and a relative humidity of 0% and a water absorption of at least 0.5% at a temperature of 20° C. and a relative humidity of 100%, and layers of a moisture-resistant thermoplastic resin disposed on both the sides of the intermediate layer.

In accordance with another aspect of the present invention, there is provided a plastic multilayer vessel having a laminate structure comprising a first intermediate layer of a gas-barrier thermoplastic resin having an oxygen permeation coefficient smaller than $10^{-12}$ cc·cm/cm$^2$·sec·cmHg at a temperature of 20° C. and a relative humidity of 0%, a second intermediate layer of a resin composition formed by incorporating an organic metal complex of a transition metal in a moisture-absorbing thermoplastic resin having a water absorption of at least 0.5% at a temperature of 20° C. and a relative humidity of 100%, and layers of a moisture-resistant thermoplastic resin disposed on both the sides of the intermediate layers.

DETAILED DESCRIPTION OF THE INVENTION

Figure 1:
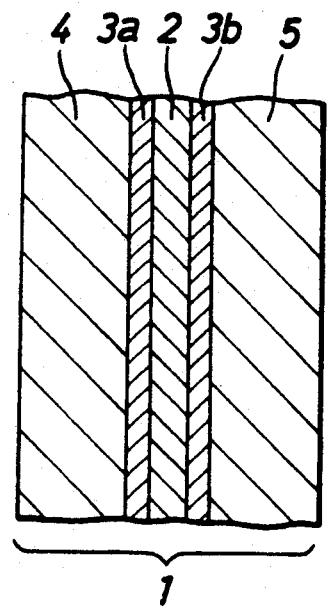
FIGS. 1 and 2 are sectional views showing examples of the multilayer structure of the vessel of the present invention.

In the plastic multilayer vessel of the present invention, a laminate structure comprising an intermediate layer of a gas-barrier resin and layers of a moisture-resistant resin disposed on both the sides of the intermediate layer is adopted as in the conventional plastic multilayer vessels, but the plastic multilayer vessel of the present invention is characterized in that an organic metal complex of a transition metal is incorporated into the moisture-absorbing gas-barrier resin to be used for the intermediate layer.

The organic metal complex of a transition metal used in the present invention is characterized in that the transition metal coordinates with an organic ligand such as a nitrogen-containing base, and the absorption of oxygen, that is, the oxidation of the metal ion, is advanced promptly even when the oxygen partial pressure is low.

In general, the presence of water is indispensable for the oxidation of a metal ion. In the present invention, by skillfully utilizing the fact that an oxygen-barrier resin is highly hygroscopic and the fact that in an organic metal complex of a transition metal, the metal coordinates in the form of an ion, a minute amount of water captured by the absorption of moisture by the oxygen-barrier resin is effectively utilized for capturing a minute amount of oxygen by the oxidation.

In the plastic multilayer vessel of the present invention, in the normal state, it is the gas-barrier resin layer as the intermediate layer that is effective for preventing the permeation of oxygen, that is, the interception of oxygen. However, under conditions in which water and heat simultaneously act, for example, under heat sterilization conditions, the organic metal complex of a transition metal present in the gas-barrier resin is very effective for the interception of oxygen, and the allotment of the function can be effectively done according to the state where the vessel is placed. As pointed out hereinbefore, under conditions in which water and heat simultaneously act, conspicuous permeation of water is caused through the moisture-resistant resin layer, and the oxygen-barrier performance of the gas-barrier resin is reduced by the absorption of moisture and the elevation of the temperature. The organic metal complex of the transition metal is activated by absorbed water and heat, and oxygen is effectively captured by the oxidation, with the result that the permeation of oxygen at the heat sterilization is controlled. Of course, we do not deny that in the normal state, the oxygen-intercepting action is exerted by the organic metal complex.

In order to attain the intended object of the present invention, it is important that the gas-barrier resin used in the present invention should have an oxygen permeation coefficient smaller than $10^{-12}$ cc·cm/cm$^2$·sec·cmHg, especially smaller than $5 \times 10^{-13}$ cc·cm/cm$^2$·sec·cmHg, at a temperature of 20° C. and a relative humidity of 0%. In the case where a single intermediate layer is used according to the first embodiment of the present invention, this gas-barrier resin should have a water absorption of at least 0.5%, especially at least 1.0%, at a temperature of 20° C. and a relative humidity of 100%. If the water absorption is below the above-mentioned range, the oxygen-capturing property of the organic metal complex of the transition temperature tends to decrease.

In the plastic multilayer vessel of the present invention, the intermediate layer can have a multilayer structure comprising at least two layer.

Namely, according to the second embodiment of the present invention, the intermediate layer has a function-separating multilayer structure comprising a plurality of layers. More specifically, the intermediate layer comprises a first intermediate resin layer composed of a gas-barrier resin having the above-mentioned oxygen permeation coefficient and a second intermediate layer composed of a moisture-absorbing resin having the above-mentioned water absorption, and the organic metal complex is incorporated in the second intermediate layer.

Of course, in this embodiment, there can be adopted a modification in which a plurality of layers are formed for the oxygen-barrier resin layer, the organic metal complex is incorporated into one layer, and the other layer is an organic metal complex-free oxygen-barrier resin layer.

Referring to FIG. 1 illustrating one example of the multilayer structure of the vessel of the present invention, this vessel wall 1 comprises a gas-barrier resin intermediate layer 2 having an organic metal complex of a transition metal incorporated therein, and inner and outer layers 4 and 5 of a moisture-resistant resin disposed on both the sides of the intermediate layer 2, if necessary through adhesive layers 3a and 3b.

Figure 2:
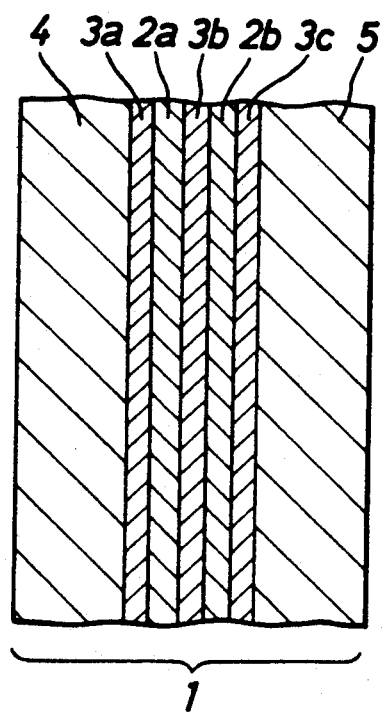

Referring to FIG. 2 illustrating another example of the multilayer structure, this vessel wall 1 comprises a multilayer intermediate layer 2 including a gas-barrier resin layer 2a in which an organic metal complex of a transition metal is not incorporated and a moisture-absorbing resin layer 2b in which an organic metal complex of a transition metal is incorporated, the layers 2a and 2b being bonded to each other, if necessary through an adhesive layer 3b, and inner and outer layers 4 and 5 of a moisture-absorbing resin disposed on both the sides of these intermediate layers, if necessary through adhesive layers 3a and 3c.

Any of metals capable of taking a plurality of states differing in the valency can be used as the transition metal in the present invention. Especially, at least one member selected from the group consisting of iron, cobalt and nickel is preferably used.

Any of organic ligands allowing the oxidation of the transition metal can be used as the organic ligand constituting the organic metal complex in the present invention. In general, a ligand of the weak coordination system, particularly a nitrogen-containing base ligand, is used.

The following compounds can be mentioned as the nitrogen-containing base ligand.

(1) Aliphatic Amines

Linear amines such as ethylenediamine, diethylenetriamine, triethylenetetraamine, dimethylaminopropylamine, diethylaminopropylamine, tetraethylenepentaamine and polyethyleneimine.

(2) Heterocyclic Amines

Imidazole, methylimidazole, dimethylimidazole, imidazoline, pyridine, aminopyridine, pyrimidine, benzoimidazole and benzotriazole.

(3) Porphyrins

Etioporphyrin, mesoporphyrin, protoporphyrin, deuteroporphyrin, hematoporphyrin, coproporphyrin and uroporphyrin.

In the present invention, the organic metal complex can be used in the form of either a low-molecular-weight complex or a high-molecular-weight complex. As the high-molecular-weight complex, there can be mentioned metal complexes in which polyvinylpyridine, poly-(1-vinyl)-2-methylimidazole, polyvinyl pyrrolidone or the like coordinates with a nitrogen-containing base ligand as mentioned above. Furthermore, there can be mentioned metal complexes in which a dimer, trimer or polymer of a porphyrin coordinates with a transition metal.

Organic ligands as mentioned above can be used in the form crosslinked with epichlorohydrin, ethylene oxide, salicylic acid or the like.

The organic metal complex of the transition metal can be used singly or in the state supported on the surface of an inorganic carrier. Amorphous silica is preferably used as the inorganic carrier, but silica-alumina, clays, zeolite, talc, glass powder and active carbon can also be used. The method of supporting the organic metal complex on the inorganic carrier is not particularly critical, but there is preferably adopted, for example, a method in which an organic group such as a vinyl group, an amino group or a haloalkyl group is introduced into the surface of a carrier by using a silane coupling agent or titanate coupling agent, the organic group is reacted with a nitrogen-containing base ligand and a transition metal ion is caused to coordinate with the ligand. The coordination of the transition metal is accomplished by reacting the nitrogen-containing base ligand with a solution of a chloride of the transition metal.

The concentration of the transition metal in the organic metal complex is preferably at least 5 mg-atom/100 g of the complex and especially preferably at least 30 mg-atom/100 g of the complex.

A thermoformable thermoplastic resin having the above-mentioned oxygen permeation coefficient and moisture-absorbig property is used as the gas-barrier resin. An ethylene/vinyl alcohol copolymer is especially preferable as the gas-barrier resin. For example, a copolymer obtained by saponifying an ethylene/vinyl acetate copolymer having an ethylene content of 20 to 60 mole %, especially 25 to 50 mole %, so that the saponification degree is at least 96 mole %, especially at least 99 mole %, is used. This saponified ethylene/vinyl alcohol copolymer should have a film-forming molecular weight. It is preferred that the viscosity of the copolymer be at least 0.01 dl/g, especially at least 0.05 dl/g, as measured at 30° C. in a mixed solvent comprising phenol and water at a weight ratio of 85/15.

As another examples of the gas-barrier resin having the above-mentioned characteristics, there can be mentioned polyamides having 5 to 50 amide groups, especially 6 to 20 amide groups, per 100 carbon atoms, such as nylon 6, nylon 6,6, a nylon 6/6,6 copolymer, poly(-metaxylylene adipamide), nylon 6,10, nylon 12 and nylon 13. The polyamide should have a film-forming molecular weight, and it is preferred that the relative viscosity ($\eta$rel) be at least 1.1, especially at least 1.5, as measured at a temperature of 30° C. and a concentration of 1.0 g/dl in concentrated sulfuric acid.

The organic metal complex of the transition metal is preferably used in an amount of 0.1 to 100% by weight, especially 1 to 50% by weight, based on the gas-barrier resin. If the content of the organic metal complex of the transition metal is too low and below the above-mentioned range, the oxygen permeation at the heat sterilization is larger than in the case where the content of the organic metal complex is within the above-mentioned range. If the content of the organic metal complex exceeds the above-mentioned range, the oxygen permeation in the normal state tends to be larger than in the case where the content of the organic metal complex is within the above-mentioned range.

Even if the amount incorporated of the organic metal complex is relatively small, a sufficient oxygen-intercepting property can be obtained, and the ratio of utilization of the complex for the absorption of oxygen is high. This is one the characteristics of the organic metal complex used in the present invention. Furthermore, this organic metal complex has an excellent dispersibility in the gas-barrier resin. This is another characteristic property of the organic metal complex used in the present invention.

The thickness of the metal complex-incorporated gas-barrier resin layer depends on the allowable amount of oxygen in the vessel, but it is preferred that the thickness of this resin layer be 5 to 200 $\mu$m, especially 10 to 120 $\mu$m.

In the case where a combination of an organic metal complex-free gas-barrier resin intermediate layer and an organic metal complex-incorporated moisture-absorbing resin intermediate layer is used as the intermediate layer, the organic metal complex-free gas-barrier resin layer can be composed of a moisture-absorbing gas-barrier resin as mentioned above, or a lowly moisture-absorbing gas-barrier resin such as a vinylidene chloride copolymer resin, a high-nitrile resin or a gas-barrier polyester resin. The moisture-absorbing resin in which the organic metal complex of the transition metal is incorporated can be a resin having a gas-barrier property, such as the above-mentioned moisture-absorbing gas-barrier resin, or can be other moisture-absorbing thermoplastic resin such as polyacrylic acid, polymethacrylic acid, polyacrylamide, polyvinyl pyrrolidone, polyvinyl methyl ether or a vinyl alcohol/acrylic acid copolymer. The amount of the organic metal complex of the transition metal incorporated in the moisture-absorbing resin may be within the range mentioned above with respect to the gas-barrier resin. It is preferred that the total thickness of both of the intermediate layers be within the above-mentioned range and the thickness ratio of the organic metal complex-incorporated layer to the organic metal complex-free layer be in the range of from 95/5 to 5/95, especially from 75/25 to 25/75.

In the present invention, a thermoplastic resin having a water absorption smaller than 0.5%, especially smaller than 0.1%, as determined according to the method of ASTM D-570, is used as the moisture-resistant resin (lowly water-absorbing resin) to be arranged on both the sides of the intermediate layer. As typical examples, there can be mentioned olefin resins such as low-density, medium-density and high-density polyethylenes, isotactic polypropylene, an ethylene/propylene copolymer, polybutene-1, an ethylene/butene-1 copolymer, a propylene/butene-1 copolymer, an ethylene/-propylene/butene-1 copolymer, an ion-crosslinked olefin copolymer (ionomer) and blends thereof. Furthermore, there can be used styrene resins such as polystyrene, a styrene/butadiene copolymer, a styrene/isoprene copolymer and an ABS resin, thermoplastic polyesters such as polyethylene terephthalate and polytetramethylene terephthalate, and polycarbonates.

Sometimes, a sufficient adhesiveness cannot be attained at the lamination between the gas-barrier resin and the moisture-resistant thermoplastic resin, as in the case where an ethylene/vinyl alcohol copolymer is used. In this case, an adhesive resin layer is interposed between the two layers.

As the adhesive resin, there can be used a thermoplastic resin containing on the main chain or side chain a carbonyl group

derived from a carboxylic acid, a carboxylic acid anhydride, a carboxylic acid salt, a carboxylic acid amide or a carboxylic acid ester at a concentration of 1 to 700 neq/100 g of the resin, especially 10 to 500 meq/100 g of the polymer. As suitable examples of the adhesive resin, there can be mentioned an ethylene/acrylic acid copolymer, an ion-crosslinked olefin copolymer, maleic anhydride-grafted polyethylene, maleic anhydride-grafted polypropylene, an acrylic acid-grafted polyolefin, an ethylene/vinyl acetate copolymer, a copolyester, a copolyamide and blends thereof. The adhesive resin is advantageously laminated by co-extrusion or sandwich lamination. An isocyanate type or epoxy type thermosetting adhesive resin can be used for bonding preliminarily formed gas-barrier resin and moisture-resistant resin films.

In the multilayer structure of the present invention, it is preferred that the thickness of the moisture-resistant resin layer be 20 to 3000 $\mu$m, especially 100 to 1500 $\mu$m, and 4 to 600 times, especially 10 to 150 times, the thickness of the intermediate layer. The thicknesses of the inner and outer layers may be equal to each other, or the thickness of one of the inner and outer layers may be larger that of the other layer.

The vessel of the present invention can be prepared according to any of known processes except that the above-mentioned layer structure is adopted.

In the multiple layer co-extrusion, melt kneading is carried out in extruders corresponding to the respective resin layers, and the melts are extruded in a predetermined shape through a multilayer multiply die such as a T-die or circular die. Furthermore, there can be adopted a process in which melt kneading is carried out in injection molding machines corresponding to the respective resin layers, and the melts are coinjected or sequentially injected into an injection mold to form a multilayer vessel or vessel preform. Moreover, there can be adopted such a lamination process as a dry lamination process, a sandwich lamination process or an extrusion coating process. The molded body can take a shape of a film, a sheet, a bottle- or tube-forming parison or pipe, or a bottle- or tube-forming preform. Formation of a bottle from a parison, pipe or tube can be easily accomplished by pinching off the extrudate by a pair of split molds and blowing a fluid into the extrudate. Furthermore, a draw-blow-formed bottle can be obtained by cooling a pipe or preform, heating the pipe or preform at a drawing temperature, and drawing the heated pipe or preform in the axial direction and simultaneously blow-drawing the pipe or preform in the circumferential direction by a fluid pressure. Still further, a cup-shaped or tray-shaped packaging vessel can be obtained by subjecting a film or sheet to vacuum forming, air-pressure forming, bulging forming or plug assist forming.

Still in addition, a multilayer film is piled or folded in the form of a bag and the periphery is heat-sealed to form a bag-shaped vessel.

The present invention will now be described in detail with reference to the following examples that by no means limit the scope of the invention.

EXAMPLE 1

An oxygen scavenger composed of a tetraethylenepenta-amine/cobalt complex supported on a silica gel was mixed into a pellet of an ethylene/vinyl alcohol copolymer (having an ethylene content of 32 mole % and a saponification degree of 99.6 mole %) having an oxygen permeation coefficient of $4 \times 10^{-14}$ cc·cm/cm$^2$·sec·cmHg at a temperature of 20° C. and a relative humidity of 0% and a water absorption of 4.8% at a temperature of 20° C. and a relative humidity of 100% by a batch-type high-speed stirring blade mixer (Henschel mixer). The mixing ratio of the oxygen scavenger was 7% by weight. Then, the mixture was pelletized by a pelletizer comprising an extruder having a screw having a diameter of 50 mm, a strand die, a blower cooling tank and a cutter. By using the pelletized mixture (EO) of the ethylene/vinyl alcohol copolymer and the oxygen scavenger for the intermediate layer, polypropylene (PP) having a melt index of 0.5 g/10 min (230° C.) for the inner and outer layers and maleic anhydride-modified PP (ADH) having a melt index of 1.0 g/10 min for the adhesive layers, a symmetric three-resin 5-layer sheet (having a total thickness of 0.9 mm and a PP/ADH/EO/ADH/PP thickness ratio of 12/1/2/1/12) was formed by a multilayer sheet-forming machine comprising an extruder having a screw diameter of 50 mm for the inner and outer layers, an extruder having a screw diameter of 32 mm for the adhesive layers, an extruder having a screw diameter of 32 mm for the intermediate layer, a feed block, a T-die, a cooling roll and a sheet take-up machine. The above-mentioned three-resin 5-layer sheet was heated at about 190° C. and formed into a cup-shaped vessel having a height of 15 mm, a mouth diameter of 100 mm and an inner volume of 117 ml by a vacuum forming machine. This cup was filled with 2 ml of distilled water in a nitrogen atmosphere and heat-sealed with a seating material composed of aluminum foil/PP. The vessel was heat-sterilized at 120° C. for 30 minutes and stored at a temperature of 20 C. and a relative humidity of 60%. After the lapse of a certain period, the oxygen concentration in the vessel was measured by a gas chromatograph apparatus (GC). For comparison, a cup was formed in the same manner as described above except that the oxygen scavenger was not incorporated in the ethylene/vinyl alcohol copolymer, and filling, sealing, heat sterilization and measurement were carried out in the same manner as described above. The obtained results are shown in Table 1. Prominent effects were attained in the product of the present invention formed by using the oxygen scavenger, and the oxygen permeation quantity was reduced to less than ½ of the oxygen permeation quantity in the comparative product.

EXAMPLE 2

The same oxygen scavenger as used in Example 1, that had an average particle size of 40 $\mu$m, was mixed into polypropylene (PP) having an oxygen permeation coefficient larger than $5 \times 10^{-11}$ cc·cm/cm$^2$·sec·cmHg at a temperature of 20° C. and a relative humidity of 0%, a water absorption lower than 0.5% at a temperature of 20° C. and a relative humidity of 100% and a melt index (MI) of 0.5 g/10 min (230° C.) by a batch-type high-speed stirred blade mixer (Henschel mixer), and the mixture was pelletized by the same pelletizer as used in Example 1. A symmetric three-resin 5-layer sheet (having a total thickness of 0.9 mm and a PPO-/ADH/E/H/PPO thickness ratio 12/1/2/1/12) was formed by using the pelletized, oxygen scavenger-incorporated PP (PPO) for the inner and outer layers, an ethylene/vinyl alcohol copolymer (E) having an ethylene content of 32 mole % and a saponification degree of 99.6 mole % for the intermediate layer and the same maleic anhydride-modified PP (ADH) as used in Example 1 for the adhesive layers in the same multilayer sheet-forming machine as used in Example 1. The sheet was formed into a cup-shaped vessel in the same manner as described in Example 1.

In the same manner as described in Example 1, in a nitrogen atmosphere, the cup was filled with 2 ml of distilled water, sealed and heat-sterilized, and the amount of oxygen in the vessel was measured at predetermined time intervals by a gas chromatograph apparatus. For comparison, a cup formed by using oxygen scavenger-free PP for the inner and outer layers was similarly tested. The obtained results are shown in Table 1. When the oxygen scavenger was incorporated into PP, prominent effects as obtained in Example 1 were not attained.

EXAMPLE 3

A transition metal complex oxygen scavenger having an average particle size of 40 μm was incorporated into a pellet of a nylon 6/6,10 copolymer (Novamid 2030 supplied by Mitsubishi Kasei) having an oxygen permeation coefficient of $6 \times 10^{-13}$ cc·cm/cm$^2$·sec·cmHg at a temperature of 20° C. and a relative humidity of 0% and a water absorption of 8.1% at a temperature of 20° C. and a relative humidity of 100%, and the mixture was pelletized in the same manner as described in Example 1. By using this oxygen scavenger-incorporated nylon (NO) and the same PP and ADH as used in Example 1, a symmetric tree-resin 5-layer sheet (having a total thickness of 0.9 mm and a PP/ADH/NO/ADH/PP thickness ratio of 12/1/2/1/12) was formed in the same manner as described in Example 1. In the same manner as described in Example 1, the sheet was formed into a cup-shaped vessel, the vessel was filled with 2 ml of distilled water in a nitrogen atmosphere, sealed and heat-sterilized, and the oxygen concentration in the vessel was measured at predetermined time intervals by GC. For comparison, the test was similarly carried out by using the oxygen scavenger-free nylon. The obtained results are shown in Table 1. Prominent effects were attained when the oxygen scavenger-incorporated nylon resin was used, and the amount of oxygen permeating through the vessel wall was reduced to about ½ of the permeating oxygen quantity in the comparitive vessel.

EXAMPLE 4

By using the same pelletized mixture (EO) of the ethylene/vinyl alcohol copolymer and the metal complex oxygen scavenger as used in Example 1 for the intermediate layer, a boiling water-resistant polycarbonate resin (PC) (Panlite K-1300 supplied by Teijin Kasei) for the inner and outer layers and maleic anhydride-modified PP (ADH) (admer 5050) for the adhesive layers a three-resin 5-layer sheet was prepared in the same manner as described in Example 1. Then, in the same manner as described in Example 1, the sheet was formed into a cup, the cup was filled, sealed and heat-sterilized, and the oxygen concentration in the vessel was measured at predetermined time intervals by DC. For comparison, a cup was prepared and tested in the same manner except that oxygen scavenger-free PET was used for the intermediate layer. The product of the present invention showed prominent effects over the comparative product.

EXAMPLE 5

By using the same ethylene/vinyl alcohol copolymer (E) as used in Example 1 for the first intermediate layer, a thermoplastic water-absorbing resin (Plawet supplied by Mitsubishi Yukas) containing 7% by weight of a transition metal complex oxygen scavenger (WO) for the second intermediate layer, PP having a melt index (MI) of 0.5 g/10 min (230° C.) for the inner and outer layers and maleic anhydride-modified PP (ADH) for the adhesive layers, a four-resin 7-layer sheet (having a total thickness of 0.9 mm and a PP/ADH/E/ADH/WO/ADH/PP thickness ratio of 12/1/1/1/1/1/12) was prepared in the same manner as described in Example 1. Then, in the same manner as described in Example 1, the sheet was formed into a cup, the cup was filled sealed and heat-sterilized, and the oxygen concentration was measured at predetermined time intervals. For comparison, a cup having the same layer structure was prepared without incorporating the oxygen scavenger and the cup was similarly tested. The obtained results are shown in Table 1. Prominent effects were attained according to the present invention.

TABLE 1

| | | Oxygen Concentration (%) in Vessel | | | | |
|---|---|---|---|---|---|---|
| | | Initial oxygen concentration | Oxygen concentration just after heat sterilization | Oxygen concentration after 1 month | Oxygen concentration after 2 months | Oxygen concentration after 3 months |
| Example 1 | present invention | 0.01 | 0.28 | 1.35 | 2.10 | 2.41 |
| | comparison | 0.01 | 0.55 | 3.80 | 4.73 | 5.20 |
| Example 2 | test | 0.01 | 0.52 | 3.71 | 4.56 | 4.98 |
| | comparison | 0.01 | 0.55 | 3.80 | 4.73 | 5.20 |
| Example 3 | present invention | 0.01 | 0.33 | 1.49 | 2.25 | 2.70 |
| | comparison | 0.01 | 0.61 | 3.92 | 4.99 | 5.52 |
| Example 4 | present invention | 0.01 | 0.30 | 1.47 | 2.11 | 2.56 |
| | comparison | 0.01 | 0.57 | 3.90 | 4.76 | 5.31 |
| Example 5 | present invention | 0.01 | 0.43 | 2.21 | 2.78 | 3.00 |
| | comparison | 0.01 | 0.90 | 4.89 | 5.81 | 6.22 |

As is apparent from the results obtained in the examples, if an organic metal complex of a transition metal is incorporated in an oxygen-barrier resin intermediate layer sandwiched between inner and outer layers of a moisture-resistant resin or a moisture-absorbing resin used as the intermediate layer in combination with an oxygen-barrier resin, even under conditions where water and heat simultaneously act, as in case of the heat sterilization, and the inherent oxygen-barrier property of the oxygen-barrier resin is drastically reduced, the transition metal ion activated by water supplied by the absorption of moisture and by heat effectively captures oxygen which is going to permeate through the vessel wall, and this capture is promptly advanced and effectively performed even under a low oxygen partial pressure, whereby the oxygen concentration in the vessel can be controlled to a very low level.

We claim:

1. A plastic multilayer vessel having a laminate structure comprising (A) an intermediate layer of a resin composition comprising
   (1) a gas-barrier thermoplastic resin having an oxygen permeation coefficient smaller than $10^{-12}$ cc·cm/cm$^2$·sec·cmHg at a temperature of 20° C. and a relative humidity of 0% and a water absorption of at least 0.5% at a temperature of 20° C. and a relative humidity of 100% and
   (2) an organic metal complex of
      (i) an organic ligand with a weak coordination system allowing oxidation of a transition metal, and
      (ii) a transition metal,
      said organic metal complex (2) being present in an amount of 1 to 50% by weight, based on the gas-barrier thermoplastic resin (1), and
(B) layers of a moisture-resistant thermoplastic resin disposed on both sides of the intermediate layer (A).

2. A vessel according to claim 1, wherein the organic ligand (i) of the organic metal complex (2) is a nitrogen-containing base ligand.

3. A vessel according to claim 1, wherein the organic ligand (i) of the organic metal complex (2) is an aliphatic amine selected from the group consisting of ethylenediamine, diethylenetriamine, triethylenetetraamine, dimethylaminopropylamine, diethylaminopropylamine, tetraethylenepentaamine and polyethyleneimine.

4. A vessel according to claim 1, wherein the organic ligand (i) of the organic metal complex (2) is a heterocyclic amine selected from the group consisting of imidazole, methylimidazole, dimethylimidazole, imidazoline, pyridine, aminopyridine, pyrimidine, benzoimidazole and benzotriazole.

5. A vessel according to claim 1, wherein the organic ligand (i) of the organic metal complex (2) is a porphyrin selected from the group consisting of etioporphyrin, mesoporphyrin, protoporphyrin, deuteroporphyrin, hematoporphyrin, coproporphyrin and uroporphyrin.

6. A vessel according to claim 1, wherein the organic ligand (i) of the organic metal complex (2) is a high-molecular-weight ligand selected from the group consisting of polyvinylpyridine, poly-(1-vinyl)-2-methylimidazole, and polyvinyl pyrrolidone.

7. A vessel according to claim 1, wherein the transition metal (ii) of the organic metal complex (2) is at least one member selected from the group consisting of iron, cobalt and nickel.

8. A vessel according to claim 1, wherein the amount of the transition metal (ii) in the organic metal complex (2) is at least 30 mg-atom/100 g of the organic metal complex (2).

9. A vessel according to claim 1, wherein the gas-barrier thermoplastic resin (1) is an ethylene/vinyl alcohol copolymer with an ethylene content of 20 to 60 mole %.

10. A vessel according to claim 8, wherein the gas-barrier thermoplastic resin (1) is a polyamide with 6 to 20 amide groups, per 100 carbon atoms in the polyamide.

11. A plastic multilayer vessel having a laminate structure comprising
(A) an intermediate layer of a resin composition comprising
   (1) a gas-barrier thermoplastic resin having an oxygen permeation coefficient smaller than $10^{-12}$ cc·cm/cm$^2$·sec·cmHg at a temperature of 20° C. and a relative humidity of 0% and a water absorption of a least 0.5% at a temperature of 20° C. and a relative humidity of 100% and
   (2) an organic metal complex supported on a surface of an inorganic carrier, said organic metal complex (2) comprising
      (i) an organic ligand of a weak coordination system allowing oxidation of a transition metal and
      (ii) a transition metal, and
      said organic metal complex (2) being present in an amount of 1 to 50% by weight, based on the gas-barrier thermoplastic resin (1), and
(B) layers of a moisture-resistant thermoplastic resin disposed on both sides of the intermediate layer (A).

12. A vessel according to claim 11, wherein said inorganic carrier is selected from the group consisting of an amorphous silica, a silica-alumina, a clay, a zeolite, a talc, a glass powder and an activated carbon.

13. A plastic multilayer vessel having a laminate structure comprising
(A) an intermediate layer of a resin composition comprising:
   (1) a gas-barrier thermoplastic resin having an oxygen permeation coefficient smaller than $10^{-12}$ cc·cm/cm$^2$·sec·cmHg at a temperature of 20° C. and a relative humidity of 0% and a water absorption of at least 0.5% at a temperature of 20° C. and a relative humidity of 100% and
   (2) an organic metal complex supported on a surface of an inorganic carrier, said organic metal complex (2) comprising
      (i) an organic ligand of a weak coordination system allowing oxidation of a transition metal and
      (ii) a transition metal, and said organic metal complex (2) being present in an amount of 1 to 50% by weight, based on the gas-barrier thermoplastic resin (1), and
(B) layers of a moisture-resistant thermoplastic resin disposed on both sides of the intermediate layer (A),
wherein said organic metal complex (2) is supported on the surface of the inorganic carrier by introducing an organic group using a silane coupling agent or a titanate coupling agent into the surface of the inorganic carrier, reacting the organic group with the organic ligand and coordinating a transition metal ion with the organic ligand.

14. A plastic multilayer vessel having a laminate structure comprising
(A) a first intermediate layer of a gas-barrier thermoplastic resin having an oxygen permeation coefficient smaller than $10^{-12}$ cc·cm/cm$^2$·sec·cmHg at a temperature of 20° C. and a relative humidity of 0%,
(B) a second intermediate layer of a resin composition comprising
   (1) a moisture-absorbing thermoplastic resin having a water absorption of at least 0.5% at a temperature of 20° C. and a relative humidity of 100% and
   (2) an organic metal complex of
      (i) an organic ligand of a weak coordination system allowing oxidation of a transition metal, and
      (ii) a transition metal, said organic metal complex (2) being present in an amount of 1 to 50% by weight, based on the moisture-absorbing thermoplastic resin (1), and and (C) layers of a moisture-resistant thermoplastic resin disposed on both sides of the intermediate layers (A) and (B).

15. A vessel according to claim 14, wherein the organic ligand (i) of the organic metal complex (2) is a nitrogen-containing base ligand.

16. A vessel according to claim 14, wherein the organic ligand (i) of the organic metal complex (2) is an aliphatic amine selected from the group consisting of ethylenediamine, diethylenetriamine, triethylenetetraamine, dimethylaminopropylamine, diethylaminopropylamine, tetraethylenepentaamine and polyethyleneimine.

17. A vessel according to claim 14, wherein the organic ligand (i) of the organic metal complex (2) is a heterocyclic amine selected from the group consisting of imidazole, methylimidazole, dimethylimidazole, imidazole, pyridine, aminopyridine, pyrimidine, benzoimidazole and benzotriazole.

18. A vessel according to claim 14, wherein the organic ligand (i) of the organic metal complex (2) is a porphyrin selected from the group consisting of etioporphyrin, mesoporphyrin, protoporphyrin, deuteroporphyrin, hematoporphyrin, coproporphyrin and uroporphyrin.

19. A vessel according to claim 14, wherein the organic ligand (i) of the organic metal complex (2) is a high-molecular-weight ligand selected from the group consisting of polyvinylpyridine, poly-(1-vinyl)-2-methylimidazole, and polyvinyl pyrrolidone.

20. A vessel according to claim 14, wherein the transition metal (ii) of the organic metal complex (2) is at least one member selected from the group consisting of iron, cobalt and nickel.

21. A vessel according to claim 14, wherein the amount of the transition metal (ii) in the organic metal complex (2) is at least 30 mg-atom/100 g of the organic metal complex (2).

22. A vessel according to claim 14, wherein the gas-barrier thermoplastic resin of the first intermediate layer (A) is an ethylene/vinyl alcohol copolymer with an ethylene content of 20 to 60 mole %.

23. A vessel according to claim 14, wherein the gas barrier thermoplastic resin of the first intermediate layer (A) is a polyamide having 6 to 20 amide groups, per 100 carbon atoms of the polyamide.

24. A vessel according to claim 14, wherein the gas barrier thermoplastic resin of the first intermediate layer (A) is a low moisture-absorbing gas-barrier thermoplastic resin selected from the group consisting of a vinylidene chloride copolymer resin, a high-nitrile resin and a gas-barrier polyester resin.

25. A vessel according to claim 14, wherein the moisture-absorbing thermoplastic resin (1) of the second intermediate layer (B) is a gas-barrier thermoplastic resin having an oxygen permeation coefficient smaller than $10^{-12}$ cc·cm/cm$^2$·sec·cmHg at a temperature of 20° C. and a relative humidity of 0% and a water absorption of at least 0.5% at a temperature of 20° C. and a relative humidity of 100% and selected from the group consisting of an ethylene-vinyl alcohol copolymer and a polyamide.

26. A vessel according to claim 14, wherein the moisture-absorbing thermoplastic resin (1) of the second intermediate layer (B) is at least one member selected from the group consisting of polyacrylic acid, polymethacrylic acid, polyacrylamide, polyvinyl pyrrolidone, polyvinyl methyl ether and a vinyl alcohol/acrylic acid copolymer.

27. A vessel according to claim 14, wherein the ratio of the thickness of the first intermediate layer (A) to the second intermediate layer (B) is in the range of from 75/25 to 25/75 by weight.

* * * * *